United States Patent [19]

Hansen

[11] Patent Number: 4,813,508
[45] Date of Patent: Mar. 21, 1989

[54] MODULAR INDEPENDENT AIR CUSHION SUSPENSION SYSTEM

[76] Inventor: Edward E. Hansen, Box 176, Rte. 1, Warren, Me. 04864

[21] Appl. No.: 106,437

[22] Filed: Oct. 9, 1987

[51] Int. Cl.$^4$ ............................................... B60V 1/15
[52] U.S. Cl. ...................................... 180/118; 180/125
[58] Field of Search ............... 180/118, 122, 125, 129, 180/130

[56] References Cited

U.S. PATENT DOCUMENTS

| | | | |
|---|---|---|---|
| 3,559,759 | 2/1971 | Hart | 180/118 |
| 3,835,952 | 9/1974 | Croix-Marie et al. | 180/118 |

Primary Examiner—John A. Pekar
Attorney, Agent, or Firm—Daniel H. Kane, Jr.

[57] ABSTRACT

A new air cushion support system for air cushion vehicles is composed of a plurality of annular peripheral jet units or modules distributed in an array in a common plane. Each peripheral jet module develops a separate air cushion or air bubble under the module to provide a plurality of independent air cushions under a vehicle. Each peripheral jet module or unit is a spring-loaded pressurized air valve with a control piston at the center of the valve spring biased to respond to back pressure variation of the air bubble or air cushion developed beneath the module caused by variations in terrain over which a vehicle is traveling. Each module or valve is formed by a pod defined by an inwardly sloping peripheral outer wall or pod skirt for directing pressurized air inwardly and downwardly toward the pod. Each module further includes a valve head, piston or pit seating within the pod skirt. The pit is formed with an inwardly sloping outer peripheral wall seated within the pod with the pit wall spaced from the pod skirt. The pod skirt and pit wall define the annular peripheral air jet channel of the module for developing a pressurized air bubble or air cushion. Each pit is movably mounted and spring loaded relative to the pod for independent motion of the pit vertically up and down within the pod for varying volume rate of flow of air expelled in the air curtain in response to variations in back pressure under the module during travel over varying terrain.

23 Claims, 9 Drawing Sheets

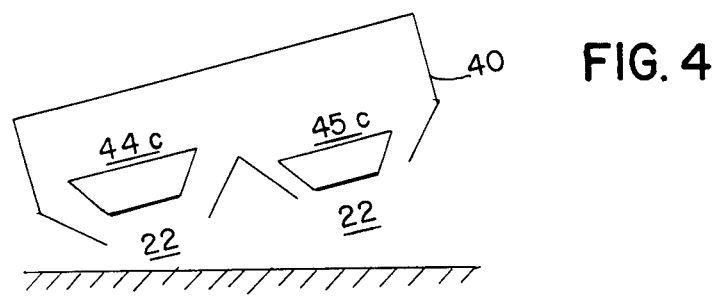
FIG. 4
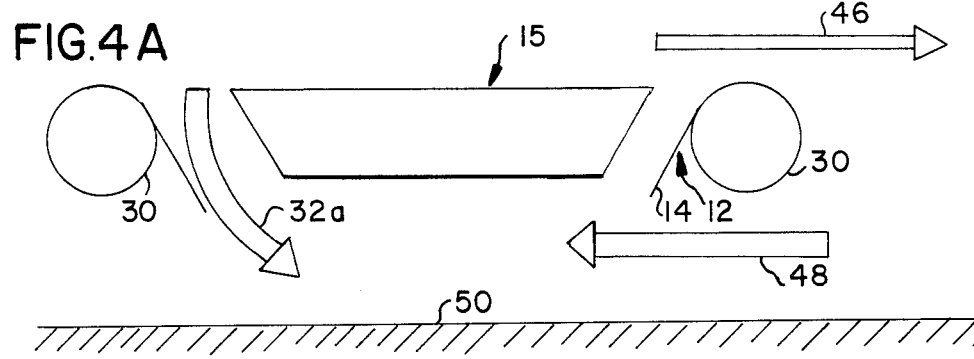
FIG. 4A
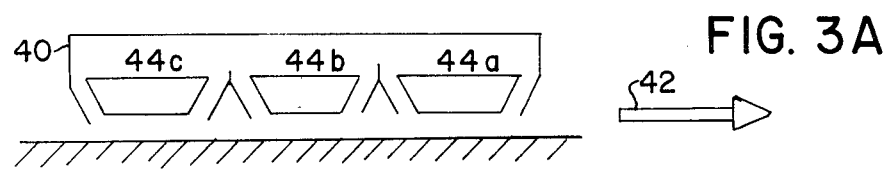
FIG. 3A
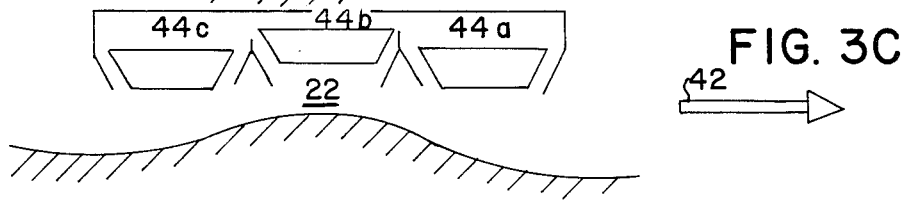
FIG. 3B
FIG. 3C

FIG. 8
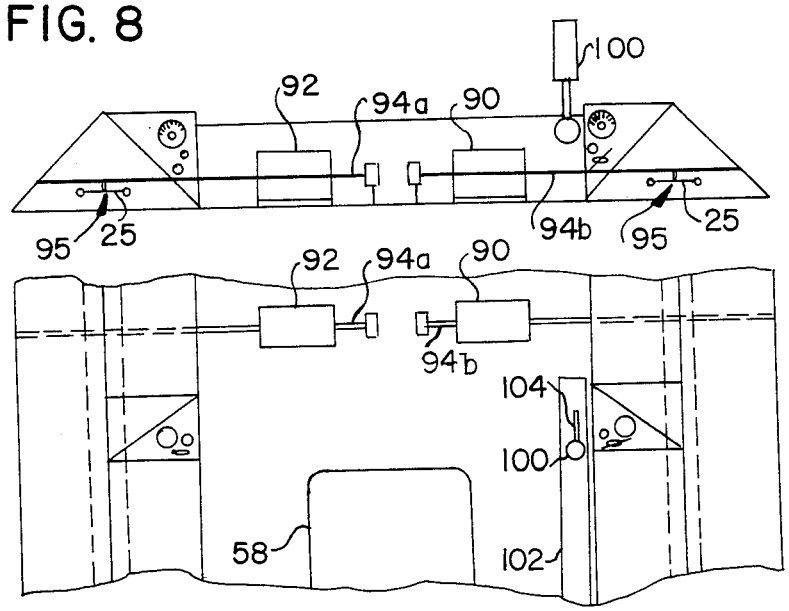
FIG. 8A
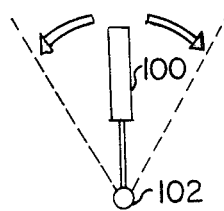
FIG. 8B
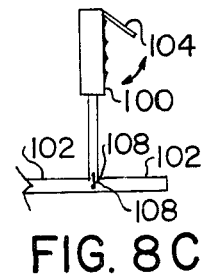
FIG. 8C
FIG. 8D
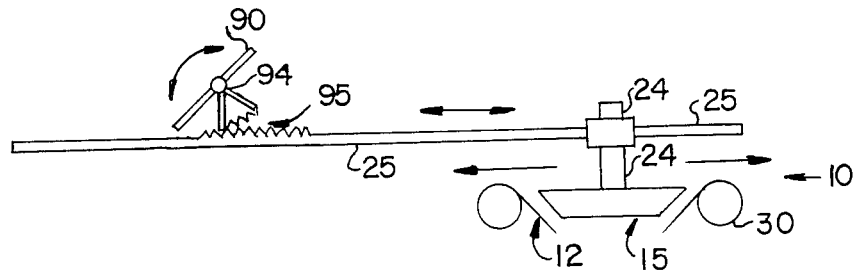

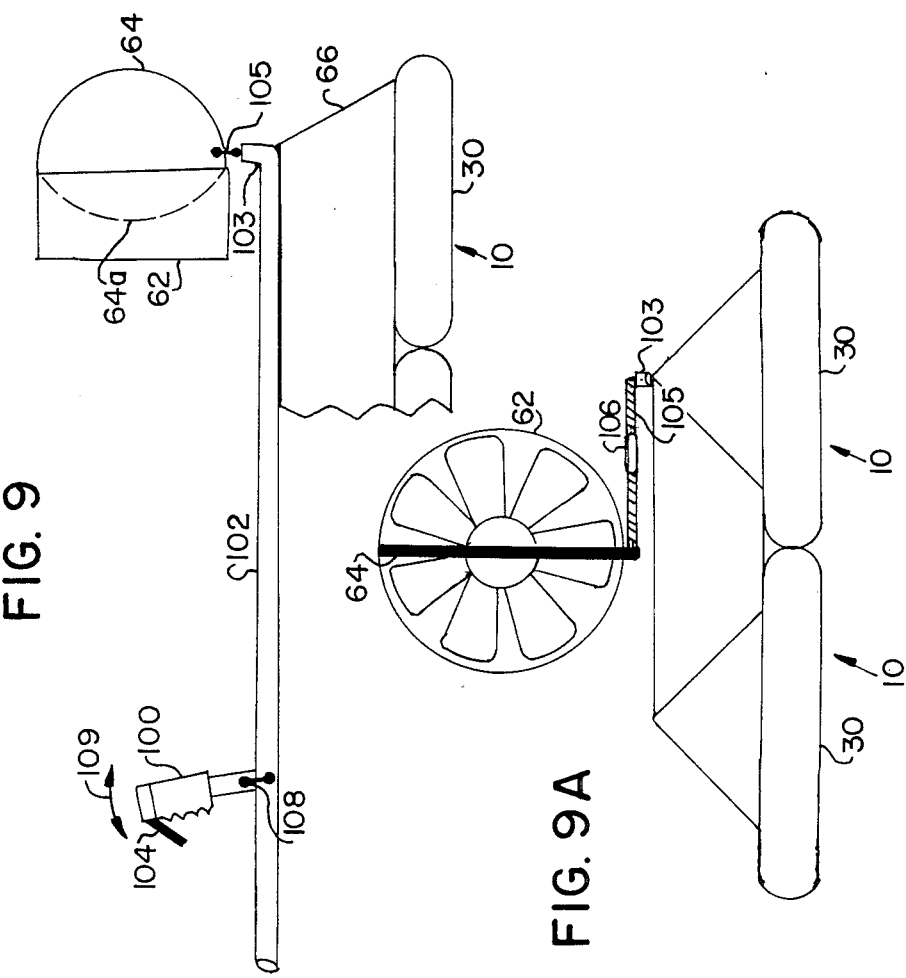

MODULAR INDEPENDENT AIR CUSHION SUSPENSION SYSTEM

TECHNICAL FIELD

This invention relates to a new air cushion support or suspension system for ground effect type vehicles also known as gas cushion, or air cushion vehicles. In particular, the invention relates to a new annular peripheral jet ground effect support system of multiple peripheral jet units or modules which provide automatic independent air cushion suspension.

BACKGROUND ART

There are two basic types of conventional air cushion vehicles. In the "plenum" type vehicle, the conventional hovercraft generates an air cushion in a large pressurized air plenum chamber under the vehicle surrounded by a depending flexible shirt. Air escapes from beneath the flexible skirt. Lift is maintained by the air pressure in the plenum chamber under the vehicle developed by a blower or propeller fan. Operative pressure containment is effected by the relative ground surface closure of the plenum from below and skirt tension around the sides.

In the "peripheral jet" type vehicle, the air cushion is generated by an annular peripheral jet which develops a high pressure bubble, air pocket or cushion under the center of the craft contained by a high pressure curtain of air. In the peripheral jet air cushion vehicles, the annular jet stream around the undersurface of the vehicle is directed downwardly and inwardly to develop this pressurized pocket of air at the center.

A disadvantage of the conventional designs for both approaches is that the integrity of the air cushion may be lost as the vehicle travels over uneven ground. The skirt of the plenum chamber or the air curtain of the peripheral jet may be opened or diverted permitting escape of air and loss of pressure. Effectively, the air cushion or bubble of air is deflated. Furthermore, flexible and selective control of the ground affect "lift" from the air cushion is not available for trimming the attitude of the craft as a result of, for example an unbalanced load which causes the craft or vehicle to list in one direction. Nor is there adequate provision for low speed maneuverability and directional control. Overall, no automatic independent suspension system has been developed for hovercraft and air cushion vehicles.

The Hart U.S. Pat. No. 3,575,116 describes a peripheral jet gas cushion structure with limited rotation of outer peripheral jet curtain defining members. The pivoting or rotation compensates for variation in pressure over the ground by locally varying the mass flow of curtain gas. A disadvantage of this approach, however, is that basically a single peripheral jet air curtain bubble is developed under the vehicle limiting the flexibility and independent response to uneven terrain.

The Pont et. al. U.S. Pat. No. 3,811,527 describes an air cushion vehicle in which compressed air is variably and differentially distributed to peripheral locations or sections by partition flaps responsive to a manual control lever for varying the lift, attitude or direction. The specification mentions that the flaps may be subject to servo control in response to flight parameters over the ground but no arrangement for automatic response is described.

In the Eggington U.S. Pat. No. 3,174,569, trim control is achieved by a variation in air flow in the air curtain around a single large air cushion in response to ground travel parameters. The single large air cushion limits flexibility of response to ground travel parameters. Bertin et. al. in U.S. Pat. No. 3,414,076 describe multiple cushions bounded by a flexible rubber annulus or ring. However, Bertin et. al. do not describe independent and automatic response to variation in ground effect parameters during travel over variable terrain.

In the Croix-Marie U.S. Pat. No. 3,698,506, trim correction and stabilization are achieved by tilting a spring loaded tilting bearing plate above the air cushion. The tilting of the spring loaded bearing plate above the cushion is intended to compensate for possible variations in the distance between the bearing plate and the ground surface. In the Hart U.S. Pat. No. 3,625,157 the entire gas cushion peripheral jet structure itself extends and retracts relative to the vehicle for tracking over the ground. U.S. Pat. No. 3,587,772 describes multiple fixed peripheral channel "air blasting" lift devices on an air cushion vehicle. There is no disclosure of automatic independent response of the fixed "air blasting" lift devices. Other patents such as the Cockerell U.S. Pat. No. 3,272,271 and the Taylor U.S. Pat. No. 3,240,282 describe peripheral jet or peripheral curtain air cushion vehicles with angularly moving or retractable walls or skirts for establishing a single large peripheral jet curtain and air cushion.

OBJECTS OF THE INVENTION

It is therefore an object of the present invention to provide a new modular peripheral jet air cushion support system with multiple air cushions providing independent suspension. A primary purpose of the invention is to provide air cushion suspension system which maintains the integrity of the air cushion lift or ground effect lift while traveling over uneven terrain.

Another object of the invention is to provide a peripheral jet air cushion suspension system of multiple modules or units for hovercraft type vehicles which provides automatic and independent response across the undersurface of the vehicle to variations in back pressure caused by variations in terrain and by uneven surfaces.

A further object of the invention is to provide a modular independent air cushion suspension system which affords flexible and selective operator control for trimming the attitude of the vehicle, for increasing lift during high speed travel, and for low speed maneuverability and control.

DISCLOSURE OF THE INVENTION

In order to accomplish these results, the present invention provides a new air cushion support system for air cushion vehicles composed of a plurality of annular peripheral jet units or modules distributed in an array in a common plain. Each peripheral jet module is constructed and arranged for developing a separate air cushion or air bubble under the module to provide a plurality of independent air cushions under a vehicle.

According to the invention, each peripheral jet module or unit comprises a spring-loaded pressurized air valve with a control piston at the center of the valve spring biased to respond to back pressure variation of the air bubble or air cushion developed beneath the module caused by variations in terrain over which a vehicle is traveling.

In the preferred example embodiment each module is formed by a pod defined by an inwardly sloping peripheral outer wall or pod skirt for directing pressurized air inwardly and downwardly in the pod. Each module further includes a valve having a valve head, piston or pit seating within the pod skirt. The pit is formed with an inwardly sloping outer peripheral wall or pit wall complementary with the pod skirt. The pit is seated within the pod with the pit wall spaced from the pod skirt. The pod skirt and pit wall define the annular peripheral air jet channel of the module for directing pressurized air from the plenum in a downwardly and inwardly directed annular air curtain for developing a pressurized air bubble or air cushion below each module.

A feature of the invention is that each pit is movably mounted and spring loaded relative to the pod for independent motion of the pit vertically up and down within the pod for varying the thickness of the annular peripheral air jet channel and therefore resistance or impedance to the volume rate of flow of air expelled in the air curtain in response to variations in back pressure of the air bubble or air cushion developed under the module during travel over varying terrain.

According to another feature of the invention, an air cushion support system housing defines and forms a plenum or manifold of passageways, channels or ducts over the array of peripheral jet modules for delivering pressurized air to the modules. The plenum is also formed with vanes or flaps mounted in the air passageways or ducts for controlling the volume rate of flow of pressurized air delivered to different modules for operator control in trimming a vehicle.

In the preferred example, each valve module is formed with a pit stem secured to the pit and extending vertically above the pit. A pit stem support is coupled to the housing and the pit stem is slideably mounted to the stem support for motion of the pit stem and pit up and down relative to the stem support and pod for varying the thickness of the peripheral jet air channel and therefore resistance or impedance to the volume rate of flow of air expelled in the air curtain through the module. A biasing spring is operatively coupled between the pit stem and pit support for automatic motion of the pit up and down within the pod in response to variations in back pressure of the air bubble or air cushion developed under the module. A feature and advantage of this arrangement is that the array of annular peripheral jet valve unit or modules effectively provide independent and automatic air cushion suspension by multiple air cushions developed under the module.

Typically the peripheral jet modules are arranged in at least two side-by-side elongate rows along the axis of the direction of travel. At least three peripheral jet modules along each row affords a level of selective, automatic and independent suspension and manual operator trim control not attained by conventional hovercraft devices.

To achieve operator control, the stem supports for the pit stems of the peripheral jet modules are horizontal rods or arms mounted over the respective rows for horizontal movement fore and aft along the longitudinal axis of the direction of travel of the vehicle for shifting the pits forward and backward in the pods. A feature and advantage of this arrangement is that the pits may be shifted forward during high-speed travel to increase the ground effect lift from the forwardly directed portion at the rear of each air curtain. The stem supports may also be shifted at low speed to maneuver the craft. Further control is afforded the operator by the moveable vanes or flaps which control the movement of pressurized air in the air passageways or ducts leading to the multiple peripheral jet modules or valves for trim control.

Other objects, features and advantages of the invention are apparent in the following specification and accompanying drawings.

BRIEF DESCRIPTION OF THE DRAWINGS

FIGS. 3A through 3C are simplified diagrammatic side views of an array of modules forming the automatic independent air cushion suspension system for a vehicle with three modules, units or valves in each row and showing the pit of the center module in different positions relative to the pod according to variations in the terrain.

FIG. 4 is a simplified diagrammatic end view of the array of modules forming the suspension system of a vehicle showing the end of two rows of modules when the vehicle has rolled to the left with the pits in different compensating positions relative to the respective pods in each row.

FIG. 4A is a simplified diagrammatic side view of a single module or peripheral jet unit in an array during travel over the ground showing increased lift achieved with the pit shifted horizontally forward in the pod.

FIG. 8 is a simplified fragmentary diagrammatic cross section of the housing or chassis substructure defining the plenum or manifold looking forward from the pilot's seat or operator's seat and showing mechanical arrangements for selected controls. FIG. 8A is a fragmentary plan view or top view from above in the vicinity of the pilot's seat. FIGS. 8B and 8C are fragmentary front and side views respectively of the joy stick.

FIG. 8D is a detailed diagrammatic fragmentary side view of the coupling between the foot pedal and the pit stem support arms or support rods for sliding action of the pits within the pods in the fore and aft direction.

FIG. 9 is a detailed fragmentary diagrammatic side view showing the coupling from the joy stick or control stick through the control rod to the rudder for propeller or fan drive air steering, while FIG. 9A is a fragmentary diagrammatic rear view of the coupling.

DESCRIPTION OF PREFERRED EXAMPLE EMBODIMENTS AND BEST MODE OF THE INVENTION

Figure 1:
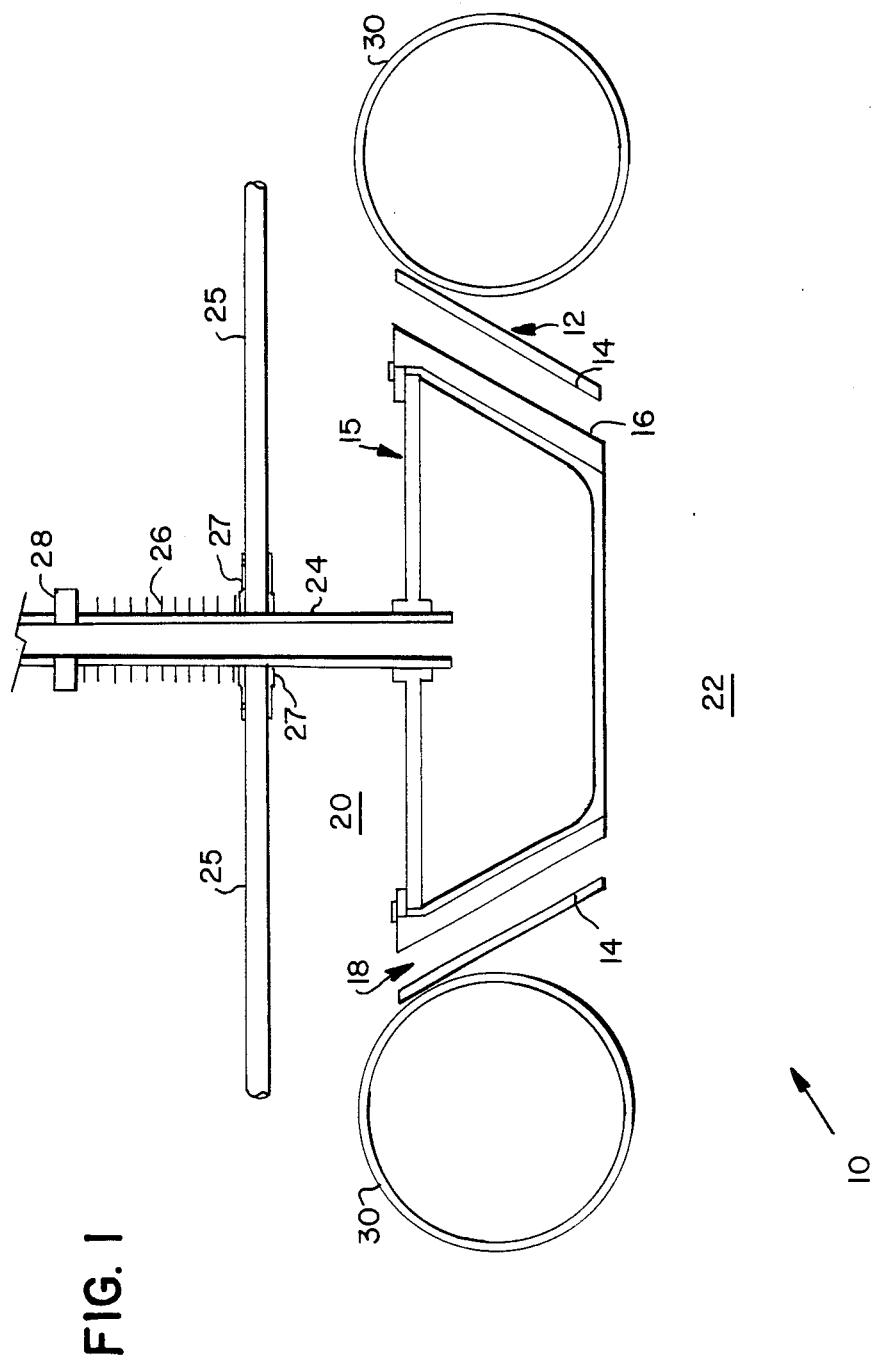
FIG. 1 is a diagrammatic fragmentary side cross section through one of the peripheral jet units, modules or valves in the array of multiple modules forming the automatic independent air cushion suspension system according to the invention.

A single annular peripheral jet unit or module according to the invention is illustrated and summarized with reference to FIG. 1. Such a peripheral jet unit or module 10 is one of a plurality of such units or modules distributed in an air cushion support system array for independent air cushion supension as hereafter described. Each module 10 includes a pod 12 defined by an inwardly sloping outer wall or pod skirt 14 for directing pressurized air inwardly and downwardly in the pod. Each module 10 further includes a valve head, piston or pit 15 seated within the pod 12 and pod skirt 14. The pit 15 is formed with an inwardly sloping outer peripheral wall 16 complementary with the pod skirt or pod wall 14. The pitwall 16 is normally spaced from the pod skirt 14 and together the pit wall 16 and pod skirt 14 define the annular peripheral jet air channel 18 of the module through which pressurized air from plenum 20 is directed downwardly and inwardly for developing the high pressure curtain of air and high pressure bubble or air pocket directly below the module 10 for example at location 22. The pod skirt 14, pit wall 16 and peripheral jet air channel 18 are all, in this preferred example, formed with similar or complementary truncated conical configuration.

The valve head, piston or pit 15 is mounted, fixed and secured to a pit stem 24 extending vertically above the pit 15. The pit stem 24 is in turn slideably mounted in a horizontal stem support 25 which is in turn coupled or mounted to the chassis, frame or housing of a hovercraft or air cushion vehicle. The pit stem 24 is slideably mounted to the horizontal stem support 25 by, for example translational bearings or simply by washers or sleeves for motion of the pit up and down within the pod, varying the thickness of the peripheral jet air channel 18 and therefore resistance or impedance to the volume rate of flow of air in the peripheral jet air curtain of the module. A biasing spring 26 is operatively coupled and constrained between the flange or brace 27 on stem support 25 and a reference edge 28 of the pit stem 24 for biasing and establishing a normal operating position or standard reference position of the pit 15 within pod 12 in turn establishing a standard operating width for the peripheral jet air channel 18.

An additional feature of the module 10 illustrated in FIG. 1 is that the pod 12 is bounded on the outside by a flexible material such as rubber pneumatic tire tube 30 which forms a protective ring or annular buffer around the pod 12. The pneumatic tube buffer 30 provides a ground rest when the hovercraft vehicle is resting on the ground and a buffer from contacts with objects or terrain from the side or below protecting the structural elements of the pod 12 and pit 15.

According to another feature of the module 10 as hereafter described the horizontal pit stem support 25 is a horizontal rod, beam or structural support mounted over a row of modules 10. The stem support 25 is mounted or coupled to the vehicle housing or chassis for lateral translation in at least one direction, for example the fore and aft longitudinal axis in the direction of travel of the vehicle for shifting the pits 15 forward and backward within the pods 12 and pod skirts 14 as hereafter described.

It is apparent that the pit 15 and pod 12 of the module 10 cooperate to form a spring loaded pressurized air valve. In each separate module 10 of an array of modules forming the air cushion support system for a hovercraft vehicle the pit 15 by means of the pit stem 24, stem support 25 and biasing spring 26, is moveably mounted and spring loaded relative to the pod for independent motion of the pit vertically up and down within the pod. Relative vertical translation or displacement between the pit 15 and pod 12 occurs automatically in response to variations in back pressure of the air bubble or air cushion developed under the module, for example at location 22, during travel over varying terrain.

Figure 2A:
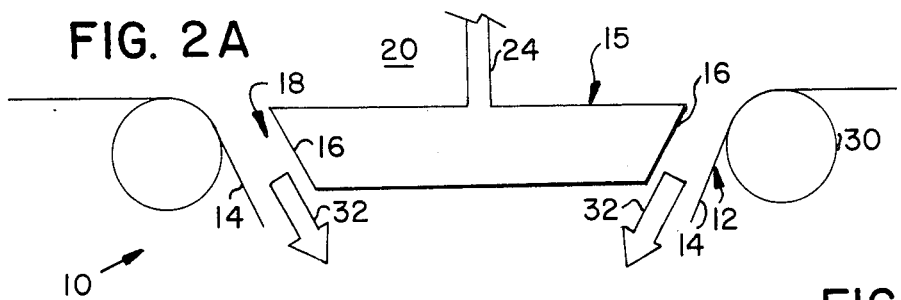
FIGS. 2A through 2D are simplified diagrammatic side views of the module showing the pit in four different positions relative to the pod, controlling the flow of pressurized air to the air curtain and air bubble or pocket developed under the module in different terrain conditions.
Figure 2B:
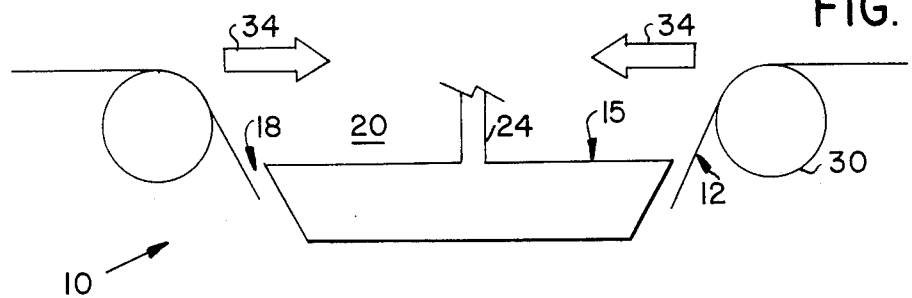

As illustrated in FIG. 2A the module has the appearance of a valve with the pit 15 seated at a normal reference or standard operating position within the pod 12 established by the biasing spring generating a high pressure peripheral jet curtain 32 having a desired volume rate of flow of air expelled in the air curtain 32 for maintaining a normal spacing distance from the ground or terrain below. If the ground or terrain fall away below the module 10, the pit 15 falls or descends to a lower position within the pod 12 constricting the peripheral jet air channel 18 and therefore increasing the resistance or impedance to the volume rate of flow of air in the peripheral jet air curtain as shown in FIG. 2B. As a result pressurized air 34 within the plenum 20 above the pod 12 is diverted away from the module 10 to other modules in the array of the air cushion support system below the hovercraft vehicle. Increased pressure and decreased resistance or impedance to the volume rate of flow of air through adjacent modules compensates for the drop in terrain under the module 10 of FIG. 2B.

Figure 2C:
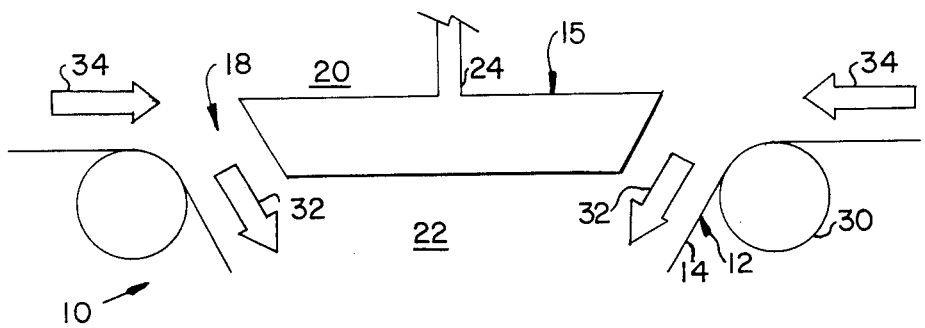

On the other hand if the terrain rises locally beneath the module 10 and approaches the pod 12, increased pressure of the air bubble or air pocket at location 22 below the module causes the valve head, piston or pit 15 to rise against the biasing spring 26 increasing the width of the peripheral jet air channel 18. As a result pressurized air 34 in the plenum 20 flows through the peripheral jet channel 18 with decreased resistance or impedance to the volume rate of flow increasing the back pressure for supporting the vehicle above the local rise in terrain. It is apparent from FIGS. 2A through 2C the manner in which the peripheral jet unit or module 10 according to the invention functions as a spring loaded pressurized air valve.

Figure 2D:
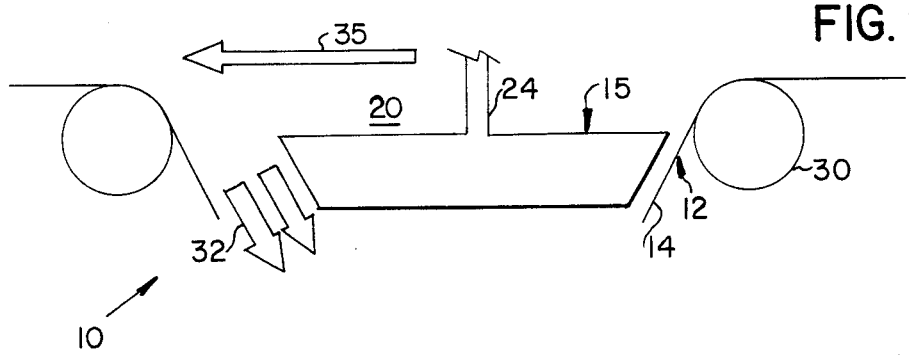

As shown in FIG. 2D the pit 15 may be translated or displaced laterally within the pod 12 by longitudinal or axial translation of the stem support 25 producing assymetry in the high pressure peripheral jet air curtain of the particular module. As hereafter describes this may be useful for increasing the lift during high speed travel. At low speeds or at rest, shifting the pits 15 within pods 12 as shown in FIG. 2D produces a net resultant movement in the direction of travel 35, for increasing maneuverability during low speed travel. The pit may also be constructed and mounted for lateral motion left and right to facilitate maneuvering the vehicle.

A row of 3 modules for example forming one side of the air cushion support system array of an air cushion vehicle according to the invention is illustrated in FIGS. 3A through 3C. With the axial direction of travel of the vehicle 40 indicated by arrow 42 each of the modules 44a, 44b and 44c diagramatically in FIG. 3A is in standard operating configuration during travel over flat or even terrain. That is to say, the pits shown diagramatically are all in the same operating position defining peripheral jet air cushions of substantially equally distributed magnitude of resistance or impedance to the volume rate of flow of air and pressure.

If the terrain falls away locally as shown in FIG. 3B, automatic adjustment occurs as the pit drops within the pod of module 44b in response to a drop in pressure of the location 22 beneath the module diverting pressurized air to increase the air curtains and pressurized air bubbles under modules 44a and 44c maintaining the stability of the vehicle.

As shown in FIG. 3C, a local rise in the terrain increases the pressure of the air bubble at location 22 under module 44b. The rise of the pit permits decreased resistance or impedance to the volume rate of flow of air into the air curtain to provide compensating back pressure locally stabilizing the vehicle. The multiple modules of the array therefore function and respond independently by increasing the back pressure in response to a rise in pressure of the location 22 beneath the module and reducing back pressure in response to a drop in pressure at the location 22 below the module. As a result an even and stable pitch or front to back attitude in the longitudinal axial direction of travel is maintained.

Automatic compensation also occurs to stabilize the vehicle from rolling to the left and right as illustrated in FIG. 4. The air cushion or hovercraft vehicle 40 is viewed from behind with 2 rows of 3 modules side by side. In the event of a roll to the left side of the vehicle 40 the row of modules 44 on the left side of the vehicle respond to increased pressure with a rise in the piston or pit permitting decreased resistance or impedance to the volume rate of flow of air and greater pressure of the air bubble or air pocket at location 22 under the left hand modules for uprighting and stabilizing the vehicle. At the same time the lower pressure at location 22 under the right hand modules 45 results in a vertical descent or drop of the pits constricting the valve and therefore increasing resistance or impedance to the volume rate of flow of air in the peripheral jet air curtains permitting the right side of the vehicle to drop and stabilize in a level attitude.

One advantage afforded by the lateral displacement capability of the pit 15 within pod 12 according to the invention is illustrated in FIG. 4A for high speed travel in the direction of arrow 46. The ground effect lift may be increased by lateral displacement of the pit 15 relative to pod 12 in the direction of travel producing assymetry in the air curtain. Increasing the volume rate of flow of air in the forwardly directed portion 32a of the high pressure air curtain interacts with the ground air 48 and ground surface 50 to increase available lift.

Figure 5:
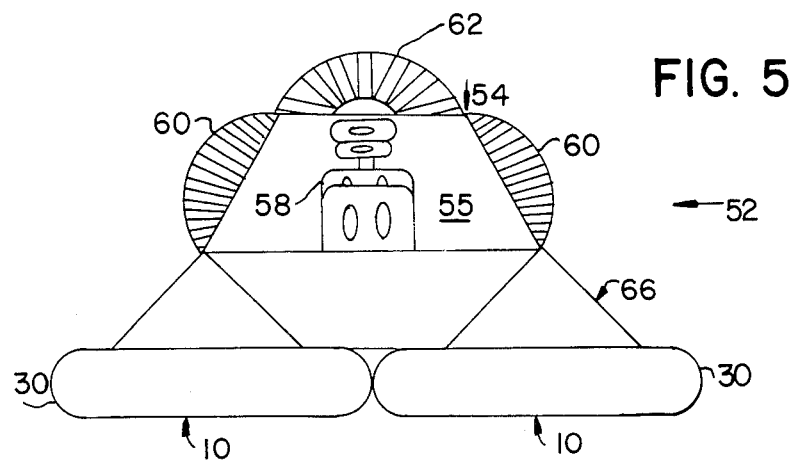
FIG. 5 is a diagrammatic front view and FIG. 6 is a diagrammatic side elevation view of a hovercraft vehicle incorporating an array of modules, units or valves in two rows of four modules each forming the automatic independent suspension system of the present invention.
Figure 6:
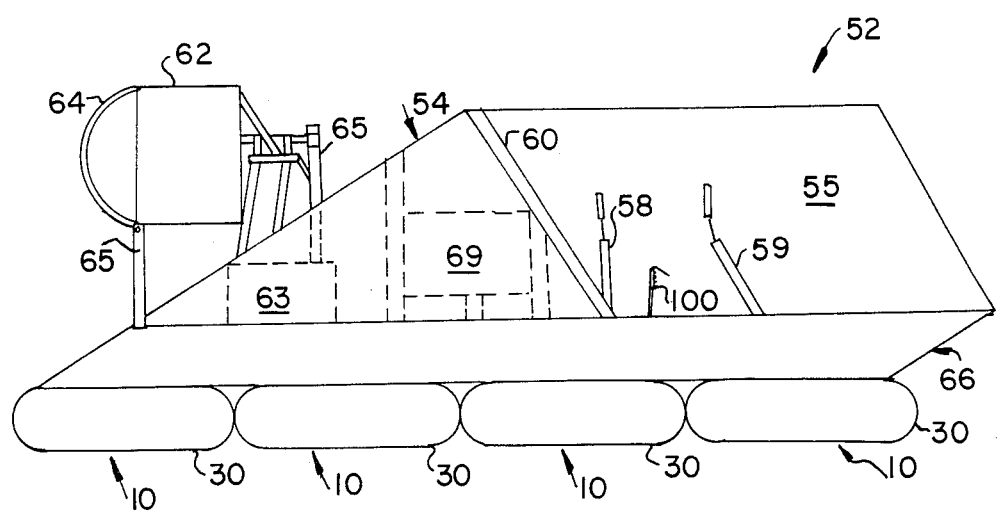

An exemplary air cushion vehicle with a modular independent suspension air cushion support system according to the invention is illustrated in FIGS. 5 and 6. The air cushion vehicle 52 is formed with an aerodynamic housing or chassis superstructure 54 including an operator cockpit 55 with joystick control 100 hereafter described, operator seat 58, and passenger seat 59. Air scoops 60 are provided on the side of the chassis superstructure for gathering lift air and supercharging or precompressing lift air delivered to the lift fan in the chassis substructure and plenum hereafter described. A forward drive or forward thrust motorized fan or prop 62 and air rudder 64 are mounted on struts 65 at the back of the vehicle for providing controlled horizontal travel over the ground surface. The forward thrust or forward drive fan 62 is powered by drive motor 63 while the lift fan or prop, hereafter described is powered by lift motor 69.

The chassis substructure 66 hereafter described with reference to FIG. 7 defines the pressurized air lift plenum and houses the lift fan not visible in FIGS. 5 and 6. At the base of the vehicle 52 is the modular independent suspension air cushion support system composed of 8 annular peripheral jet units or modules 10 as described with reference to FIG. 1 communicating with the pressurized lift air plenum defined by the chassis substructure 66. The 8 annular peripheral jet modules 10 within annular tubes 30 are arranged in a substantially coplanar array of two side by side rows of modules. The array of eight separate individualized peripheral jet air cushion or air bubble modules hereafter further described afford individualized response to variations in terrain for stabilizing the vehicle.

Figure 7:
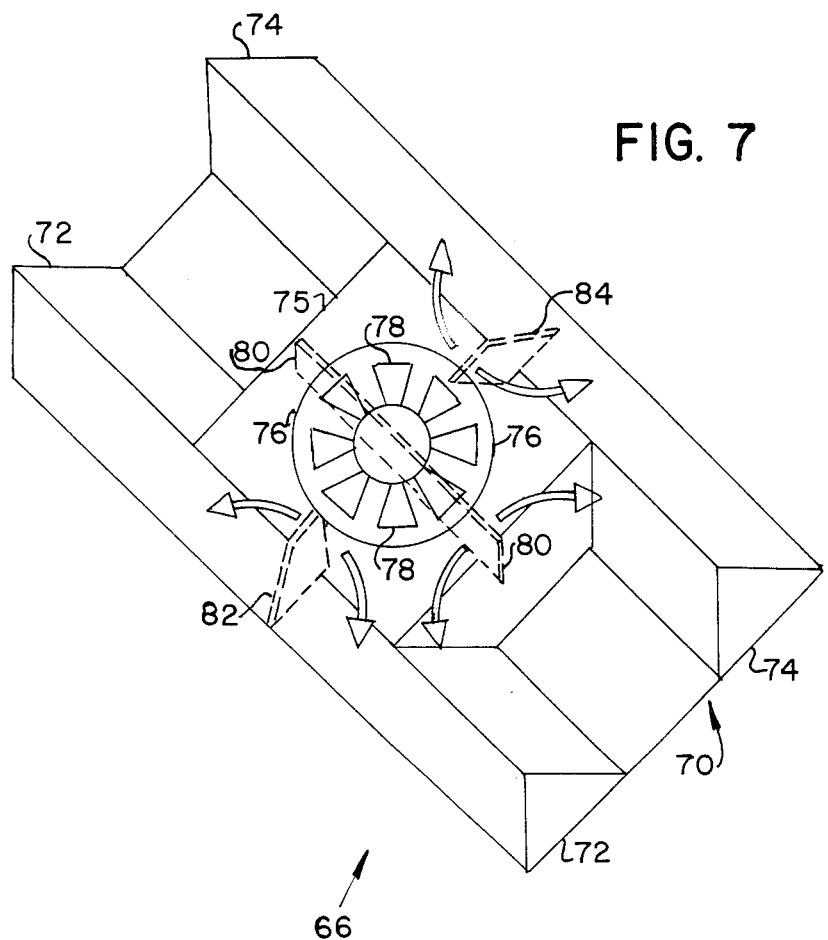
FIG. 7 is a fragmentary diagrammatic perspective view of the suspension housing or chassis substructure defining a plenum or manifold with air passageways or ducts for delivering pressurized air from a central blower or fan propeller to the respective quadrants of the suspension system.

The chassis substructure 66 defining the plenum for pressurized lift air and housing the motorized lift fan or prop is illustrated in FIG. 7. The chassis substructure 66 defines a plenum or manifold composed of air passageways and ducts which in the example of FIGS. 5 through 8 are in the configuration of an "H". The plenum or manifold 70 overlies the array of individual peripheral air jet modules which in the same example are arranged in two parallel rows. Thus, the plenum 70 includes two parallel elongate air ducts 72 and 74 positioned over the respective rows of peripheral jet modules for delivering pressurized air to the respective peripheral jet air channels 18. The air ducts 72 and 74 are joined at the middle by the cross duct 75 formed with an inlet opening 76 at the top of the duct 75. At the inlet opening 76 is mounted the motorized lift fan or prop 78 which generates and delivers pressurized air into the manifold or plenum 70.

Figure 7A:
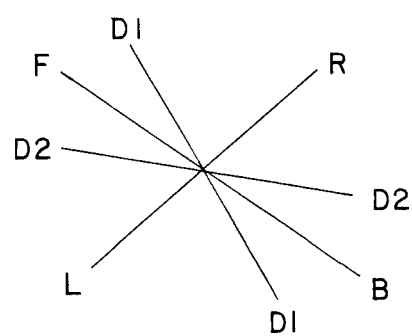
FIG. 7A is a diagramatic coordinate system representative of the front to back (F-B), left to right (L-F) and diagonal (D1—D1,D2—D2) axes of the vehicle.

Pressurized lift air generated by the motorized lift prop 78 and delivered through the overhead inlet opening 76 into the cross duct 75 of the plenum or manifold 70 is controlled distributed by control veins or flaps mounted in the air ducts for controlling the volume rate of flow of pressurized air delivered to different modules of the array. The control veins or flaps afford close operator control for trimming the vehicle and stabilizing and maintaining the attitude of the craft. The central elongate control vein 80 is pivotally mounted and centered below the pressurized air inlet 76 and is oriented in alignment with the center axis of the craft. Control vein 80 therefore controls the relative distribution of pressurized air between the two sides of the vehicle that is between the two elongate air ducts 72 and 74. Referring to the coordinate system axis of FIG. 7A control vein 80 therefore controls the lefthand and righthand role attitude or position of the craft, that is the rotational position of the left to right axis L-R.

Control veins 82 and 84 are also positioned on either side of the pressurized air inlet opening 76 at the middle of the elongate air ducts 72 and 74. Control vein 82 is pivotally mounted to the side wall of elongate air duct 72 for distributing pressurized air generated by motorized lift fan 78 and received through the inlet opening 76 to the respective front and back ends of the elongate air duct 72. Similarly control vein 84 is pivotally mounted to the side wall of elongate air duct 74 for distributing the pressurized lift air to the respective front and back ends of the elongate air duct 74.

The pitch of the vehicle is controlled by operating or pivoting the control veins 82 and 84 in unison in the same direction. With reference to the diagrammatic coordinate system of FIG. 7A pitch refers to the rotational position of the front to back axis F-B and the pitch or attitude of the F-B axis is controlled by the operation of control veins 82 and 84 in the same direction. On the other hand operation of the control veins 82 and 84 in opposite directions may be used for controlling the camber or diagonal attitude of the vehicle or craft along the diagonal axes D1—D1 and D2—D2.

Figure 10:
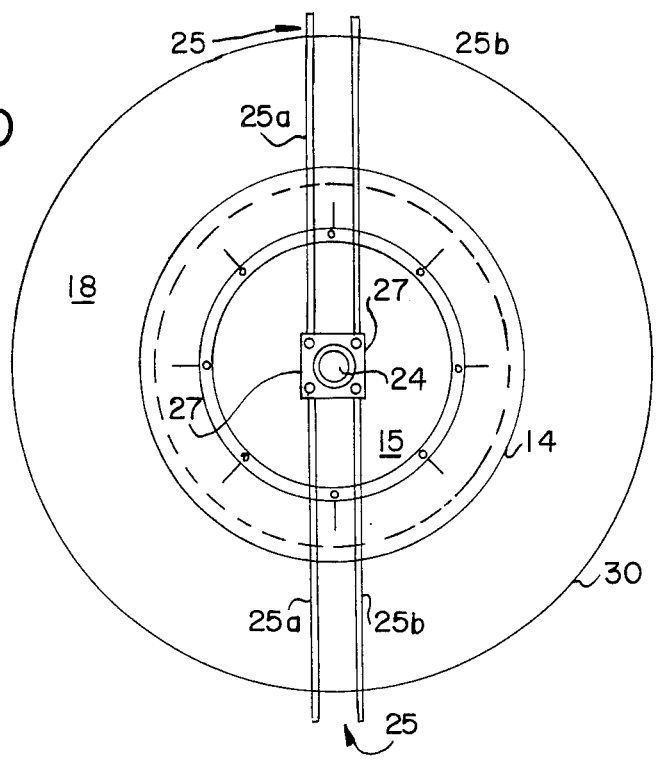
FIG. 10 is a diagrammatic plan view of a module, unit or valve showing the coupling of the stem support arm or rods to the pit stem.

Mechanical arrangments for various controls on the vehicle are illustrated in the diagrammatic fragmentary views of FIGS. 8, 8A, 8B, 8C, 8D, 9 and 9A. As shown in FIGS. 8, 8A, and 8D independent foot pedal controls 90 and 92 are provided at the operator's position in the cockpit 55. The foot pedals 90 and 92 on rods 94a and 94b independently control the front to back translation of pit stem supports 25 on either side of the vehicle. Each pit stem support 25 is formed by two rods 25a and 25b joined together extending the length of the craft from front to back as also illustrated in FIG. 10. Each stem support 25 extends the length of the vehicle over one row of the independent peripheral jet modules.

As shown in FIG. 8D the foot pedal 90 and foot pedal rod 94 engage the stem support 25 for example by a rack and pinion coupling arrangement 95 for horizontal translation of the respective pits 15 along the row of peripheral jet units 10 secured to the stem support 25 by the pit stems 24. Lateral or horizontal translation of the respective pits 15 within pods 12 in the forward and back direction may be used for low speed maneuvering and turning. For example, the foot pedals 90 and 92 may be operated in opposite directions for turning or pivoting the craft. Foot pedals 90 and 92 may be operated in the same direction for example shifting the pits 15 within pods 12 in the forward direction on both sides of the vehicle to increase lift at high speed as heretofore described.

An operator joy stick 100 is provided which may perform a number of control functions through respective linkages. For example the joy stick 100 by motion to the left and right may rotate a control rod 102 coupled to the rudder 64 behind the motorized air thrust or air drive fan 62 by rudder coupling 103 and cable 105 for drive air rudder steering behind the drive prop as shown in FIGS. 8B, 8C, 9 and 9A. Cable linkage 105 may be adjusted at turnbuckle 106. Independent throttle control may be provided for the thrust prop or drive prop motor 63 with an independent trigger or throttle control 104 operatively coupled through, for example, a rod or cable linkage to the drive motor 63 for controlling the forward thrust and speed. Controls (not shown) are also provided through, for example, conventional cable linkages as is well known to the pressurized air control veins or flaps 80, 82 and 84 for trim control of the vehicle. The trim controls are provided at the operator location within cockpit 55.

As shown in FIG. 9, the joy stick control 100 may also be coupled to shaft or rod 102 by a lever 108 to provide lift motor throttle action by rocking motion of the joy stick 100 fore and aft in the direction shown by arrow 109. The lift throttle lever 108 is coupled through, for example, a rod or cable linkage to the lift motor 69 for controlling the lift motor speed and throttle action by the motion fore and aft of the joy stick control.

A fragmentary plan view looking down on a single peripheral jet module with the plenum removed is illustrated in FIG. 10. In this example the stem support 25 is formed by two parallel rods 25a and 25b, joined by braces 27 in which are mounted the pit stems 24 for suspending the respective pits 15 within the pods and pod skirts 14 defining the peripheral jet annular air channel 18 in between. In the preferred example here described the pit 15, pit walls 16, pods 12 and pod skirts 14 shown in FIG. 1 are of truncated conical configuration. The annular tube 30 surrounds the pod and pod skirt 14 as shown in FIG. 10.

Figure 11:
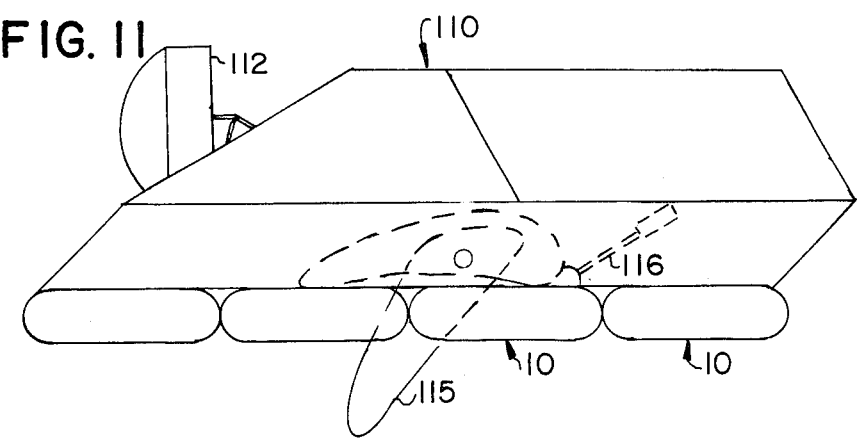
FIG. 11 is a simplified diagrammatic side view and FIG. 11A a front view of a modification of the vehicle of FIG. 5 showing retractable sideboard keels extendable into the water for enhanced maneuverability during travel over the water.
Figure 11A:
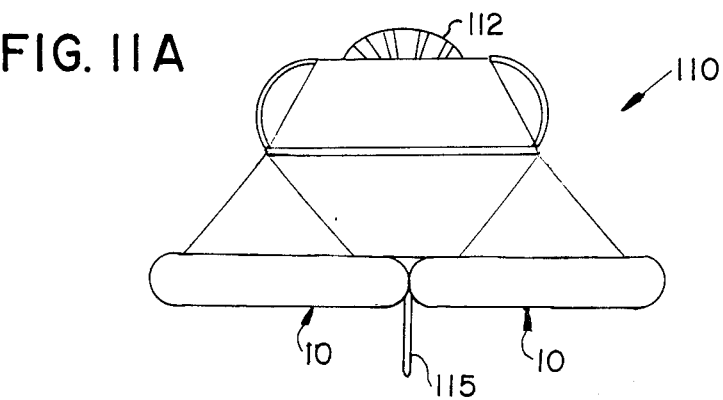

A modified air cushion vehicle 110 according to the invention is illustrated in FIGS. 11 and 11A. Visible from the outside of the vehicle is the array of peripheral jet modules or units 10 arranged in two parallel rows of 4 units each under the length of the vehicle. The motorized thrust fan and rudder 112 are also visible. At the center of the vehicle is rotatably mounted a centerboard 115 which may be deployed for operation of the vehicle over a water surface. During operation of the craft 110 slightly elevated over the surface of the water the centerboard 115 may be deployed by centerboard lever 116 which actuates rotation to the downward extending position immersed in the water for responsive control of the vehicle during steering, turning and maneuvering. Deploying the centerboard or keel in the water prevents drift which otherwise occurs during turning or in the presence of crosswinds.

In each of the embodiments of the invention, the chassis substructure 66 advantageously provides not only the air cushion support system housing defining the plenum or manifold 70 for delivering pressurized air to peripheral jet modules, but also the load bearing chassis of the vehicle. The preferred trapezoidal and triangulated configuration of the housing, manifold and chassis structure responds to the contained pressurized air with increased structural integrity and rigidity. Pressurized air actually reinforces this chassis structure.

Furthermore, the independent peripheral jet modules of the invention automatically respond to any shift in the center of gravity or normal force caused by weight shift in the vehicle, irregularities in the terrain and changing grades, climbing or descending, to stabilize the vehicle. The automatic independent suspension provided by the arrangement of pits and pods greatly improves the vehicles response to banking, cornering, grade climbing, lead shifting etc.

While the invention has been described with reference with particular embodiments it is intended to cover all variations and equivalents within the scope of the following claims.

I claim:

1. An air cushion support system for air cushion vehicles comprising:
    a plurality of annular peripheral jet units or modules distributed in an array in a common plane, each peripheral jet module being constructed and arranged for developing a separate air cushion or air bubble under the module to provide a plurality of independent air cushion under the vehicle;

an air cushion support system housing defining a pressurized air manifold formed over the array of peripheral jet modules;

each module comprising a pod defined by an inwardly sloping peripheral outer wall or pod skirt for directing pressurized air inwardly and downwardly through the pod;

each module further comprising a valve having a valve head, piston or pit seated within the pod skirt, said pit being formed with an inwardly sloping outer peripheral wall or pit wall complementary with the pod skirt, said pit being seated within the pod with the pit wall defining an annular peripheral air jet channel of the module for directing pressurized air from the manifold in a downwardly and inwardly directed annular air curtain for developing a pressurized air bubble or air cushion below each module;

said pit being moveably mounted and spring loaded relative to the housing for independent motion of the pit vertically up and down within the pod for varying the thickness of the annular peripheral air jet channel and flow of air expelled in the air curtain through said module in response to variations in back pressure of the air bubble or air cushion developed under the module during travel over varying terrain.

2. The air cushion support system of claim 1 wherein the valve further comprises a pit stem secured to the pit and extending above the pit;

wherein a pit stem support is coupled to the housing, said pit stem being sideably mounted to the stem support for motion of the pit stem and pit up and down relative to the stem support for varying the thickness of the peripheral jet air channel and flow of air expelled in the air curtain through said module;

and further comprising spring biasing means operatively coupled between the pit stem and stem support for automatic motion of the pit head and down within the pod in response to variations in back pressure of the air bubble or air cushion developed under the module.

3. The air cushion support system of claim 1 wherein the pod skirt, pit wall and annular peripheral jet air channel defined between the pod skirt and pit wall are formed in a truncated conical configuration.

4. The air cushion support system of claim 1 wherein the peripheral jet modules are arranged in at least two side by side elongate rows along the longitudinal axis of the direction of travel.

5. The air cushion support system of claim 4 wherein each row comprises at least three peripheral jet modules.

6. The air cushion support system of claim 4 wherein the stem supports of the air cushion support system are mounted for generally horizontal motion relative to the housing and further comprising vehicle operator control means for moving the stem supported horizontally thereby moving the pit stems and pits within the pods for establishing a differential in the thickness of the air curtain on either side of a peripheral jet air channel and consequent differential in the flow of air expelled on either side of the air of a module.

7. The air cushion support system of claim 6 wherein the vehicle operator control means is constructed and arranged for selectively varying horizontally in the fore and aft direction of travel the position of the pits within the pods for controlling pitch attitude and the lift achieved by ground effect at different velocities of a vehicle.

8. The air cushion support system of claim 6 wherein the stem supports comprise elongate horizontal rods or arms mounted in the housing for movement in a horizontal plane.

9. The air cushion support system of claim 8 wherein the stem support are mounted for horizontal movement fore and aft along the longitudinal axis of the direction of travel of the vehicle for shifting the pits forward and backward in the pods.

10. The air cushion support system of claim 4 wherein the manifold formed over the array of peripheral jet modules comprises an elongate air duct over each elongate row of peripheral jet modules for delivering pressurized air to the peripheral jet modules for delivering pressurized air to the peripheral jet modules and air duct control means for controlling the flow of air delivered to the peripheral jet modules.

11. The air cushion support system of claim 10 wherein the air duct control means comprise quadrant control means for controlling the flow of air delivered to the respective right and left, front and back quarters or quadrants of the air cushion support system for controlling front and back pitch attitude and diagonal pitch or chamber attitude of the vehicle.

12. The air cushion support system of claim 11 wherein the quadrant control means comprises moveable flap or vane means.

13. The air cushion support system of claim 11 wherein the air duct control means further comprises roll attitude control means for controlling the flow of air to each row on the sides of the air cushion support system for trimming and control by the roll attitude of a vehicle.

14. The air cushion support system of claim 1 wherein the manifold comprises air passageways or ducts for delivering pressurized air to the modules and vanes or flap means mounted in the air ducts for controlling the flow of pressurized air delivered to different modules for trimming a vehicle.

15. The air cushion support system of claim 1 wherein the air cushion support system housing and manifold also comprises the load bearing chassis for a hovercraft vehicle.

16. An air cushion support system for air cushion vehicles comprising:

a plurality of annular peripheral jet units or modules distributed in an array in a common plane, each peripheral jet module being constructed and arranged for developing a separate air cushion or air bubble under the module, to provide a plurality of independent air cushions under a vehicle;

an air cushion support system housing defining a manifold formed over the array of peripheral jet modules for delivering pressurized air to the modules, said housing and manifold also comprising the load bearing chassis for a hovercraft vehicle;

each module comprising a pod defined by an inwardly sloping peripheral outer wall or pod skirt around an opening for directing pressurized air downwardly through the opening;

each module further comprising a valve having a valve head, piston or pit seated within the pod skirt, said pit being formed with an inwardly sloping outer peripheral wall or pit wall complementary with the pod skirt, said pit being seated within the pod with the pit wall spaced from the pod skirt, said pod skirt and pit wall defining an annular peripheral air jet channel of the module for directing pressurized air from the plenum in a downwardly and inwardly directed annular air curtain for developing a pressurized air bubble or air cushion below each module;

each pit comprising a pit stem secured to the pit and extending above the pit;

pit support means coupled to the housing, each pit stem being slideably mounted to the stem support means for motion of the pit stem and pit up and down relative to the stem support for varying the thickness of the peripheral jet air channel and flow of air expelled in the air curtain through said module;

and spring biasing means operatively coupled between the pit stem and stem support means for automatic motion of the pit up and down within the pod in response to variations in back pressure of the air bubble or air cushion developed under the module during travel of a vehicle over varying terrain;

said stem supports of the peripheral jet modules being mounted for generally horizontal motion relative to the housing and further comprising means for moving the stem supports horizontally thereby moving the pit stems and pits within the pods for establishing a differential in the thickness of the air curtain on either side of a peripheral jet air channel and consequent differential in the flow of air expelled on either side of the air curtain of a module;

said manifold comprising air passageways or ducts for delivering pressurized air to the modules and vanes or flap means mounted in the air ducts for controlling the flow of pressurized air delivered to different modules for trimming a vehicle.

17. The air cushion support system of claim 16 wherein the peripheral jet modules are arranged in at least two elongate rows with the longitudinal axis oriented along the direction of travel, wherein the stem supports compromise elongate horizontal rods or arms mounted over the respective rows and wherein the stem supports are mounted for movement fore and aft along the axis of the direction of travel of a vehicle for shifting the pits forward and backward in the pods during travel of a vehicle.

18. An air cushion support system for ground effect air cushion vehicles comprising:
- a plurality of independent annular peripheral jet units or modules distributed in an array in a common plane for placement under a vehicle, each peripheral jet module being constructed and arranged for developing an independent air cushion or air bubble under the module, each module comprising a valve constructed and arranged for automatically varying the resistance or impedance to the volume rate of flow of pressurized air through the valve at the air cushion developed by each module in response to variations in back pressure from variable terrain over which a vehicle is traveling for stabilizing the vehicle.

19. The air cushion support system of claim 18 further comprising a manifold formed over an array of peripheral jet modules constructed and arrange for continuously delivering and distributing air to the modules, for providing an air cushion support system housing for the modules and plenum, and for providing the load bearing chassis for the hover craft vehicle.

20. The air cushion support system of claim 18 wherein the valve for independently and automatically varying the resistance or impedance to the flow of pressurized air at the air cushion developed under each peripheral jet module comprises a module structure including a pod defined by an inwardly sloping peripheral outer wall or pod skirt directing pressurized air inwardly and downwardly through the pod, a valve having a valve head, piston or pit seated within the pod skirt said pit being formed with an inwardly directed outer peripheral wall or pit wall complementary with the pod skirt, said pit being seated within the pod with the pit wall spaced from the pod skirt, said pod skirt and pit wall defining an inwardly directed annular peripheral air jet channel of the module for directing pressurized air from the manifold in a downwardly and inwardly directed annular air curtain for developing a pressurized air bubble or air cushion below the module, said pit being slideably mounted and spring loaded relative to the housing for motion of the pit automatically and vertically up and down within the pod for varying the thickness of the peripheral air jet channel and therefore the resistance or impedance to the flow of air expelled in the air curtain in response to variations in back pressure of the air bubble or air cushion developed under the module during travel over varying terrain.

21. The air cushion support system of claim 18 wherein the valve for independently and automatically varying the resistance or impedance to the flow of pressurized air at each independent air cushion comprises a spring loaded air valve piston means mounted at the center of each peripheral jet module and constructed and arranged for spring biased response to back pressure variation of the air bubble or air cushion developed beneath the module caused by variations in terrain over which a vehicle is traveling for varying the resistance or impedance to the flow of pressurized air forming the respective air cushion.

22. An air cushion support system for air cushion vehicles comprising:
- an annular peripheral jet unit or module constructed and arranged for developing an air cushion or air bubble under the module to provide an air cushion under the vehicle;
- an air cushion support system housing defining a pressurized air manifold formed over the peripheral jet module;
- said module comprising a pod defined by an inwardly sloping peripheral outer wall or pod skirt for directing pressurized air inwardly and downwardly through the pod;
- said module further comprising a valve having a valve head, piston or pit seated within the pod skirt, said pit being formed with an inwardly sloping outer peripheral wall or pit wall complementary with the pod skirt, said pit being seated within the pod with the pit wall spaced from the pod skirt, said pod skirt and pit wall defining an annular peripheral air jet channel of the module for directing pressurized air from the manifold in a downwardly and inwardly directed annular air curtain for developing the pressurized air bubble or air cushion below the module;
- said pit being moveably mounted and spring loaded relative to the housing for independent motion of the pit vertically up and down within the pod for varying the thickness of the annular peripheral air jet channel and resistance or impedance to flow of air expelled in the air curtain in response to variations in back pressure of the air bubble or air cushion developed under the module during travel over varying terrain.

23. An air cushion support system for ground effect air cushion vehicles comprising:

an annular peripheral jet unit or module for placement under a vehicle, said peripheral jet module being constructed and arranged for developing an air cushion or air bubble under the module, said module comprising a valve constructed and arranged for developing an air cushion or air bubble under the module, said module comprising a valve constructed and arranged for automatically varying the resistance or impedance to the flow of pressurized air through the valve at the air cushion developed under the module in response to variations in back pressure from variable terrain over which a vehicle is traveling for stabilizing the vehicle.

* * * * *